United States Patent
Chawla et al.

(10) Patent No.: US 12,489,832 B1
(45) Date of Patent: Dec. 2, 2025

(54) MULTI-MODAL RECOMMENDATION SYSTEM IN A CLOUD COMPUTING ENVIRONMENT

(71) Applicant: Amazon Technologies, Inc., Seattle, WA (US)

(72) Inventors: Karanpaul Singh Chawla, Chantilly, VA (US); Brijesh Luckria, Fayetteville, NC (US); Bhaskar Hosahalli Hosahalli Rangaswamy, Arlington, VA (US); Siddharth Satish Goyal, Fairfax, VA (US); Erik Nathaniel Haukenes, Falls Church, VA (US); Abhijit S. Barde, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 18/405,857

(22) Filed: Jan. 5, 2024

(51) Int. Cl.
  *H04L 67/75* (2022.01)
  *H04L 67/10* (2022.01)

(52) U.S. Cl.
  CPC .............. *H04L 67/75* (2022.05); *H04L 67/10* (2013.01)

(58) Field of Classification Search
  None
  See application file for complete search history.

(56) References Cited

U.S. PATENT DOCUMENTS

| | | | |
|---|---|---|---|
| 10,904,027 B1* | 1/2021 | Basak | H04L 12/2829 |
| 10,924,571 B1* | 2/2021 | Mutagi | H04L 67/306 |
| 11,423,451 B1* | 8/2022 | Chaudhari | G06F 16/638 |
| 12,051,419 B1* | 7/2024 | Wang | G06F 40/211 |
| 12,069,144 B1* | 8/2024 | Eberhardt | H04L 67/51 |
| 12,218,950 B1* | 2/2025 | Wang | H04L 63/20 |
| 2023/0282201 A1* | 9/2023 | Bissell | G10L 13/086 704/270 |

* cited by examiner

Primary Examiner — June Sison
(74) Attorney, Agent, or Firm — Eversheds Sutherland (US) LLP

(57) ABSTRACT

Techniques for a system to automatically recommend supported actions to a notification associated with a resource in a cloud computing environment are discussed herein. A system can includes a recommendation engine and a registry to provide centralized management of actions for responding to a notification instead of each service managing actions separately. A machine learned model can generate recommendations for resolving the notification based on a template stored in the registry that associates actions with instructions for presenting the recommendation in a respective interface modality (e.g., Chatbot, mobile application, console, etc.). In some examples, the system can implement a machine learned model, a graph model, and/or a heuristic model, to determine potential actions as recommendation data.

19 Claims, 7 Drawing Sheets

MULTI-MODAL RECOMMENDATION SYSTEM IN A CLOUD COMPUTING ENVIRONMENT

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet.

Typical recommendation services enable a business to receive recommendation information over the Internet for presentation with a particular interface type or modality. For example, recommendations can be configured for presentation on a specific device or interface that a user identifies for receiving the recommendation information. However, because the user may attempt to use various types of interfaces, and further because each interface requires different computing instructions to operate, typical recommendation services are not able to provide instructions to provide recommendations across all device and interface types.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
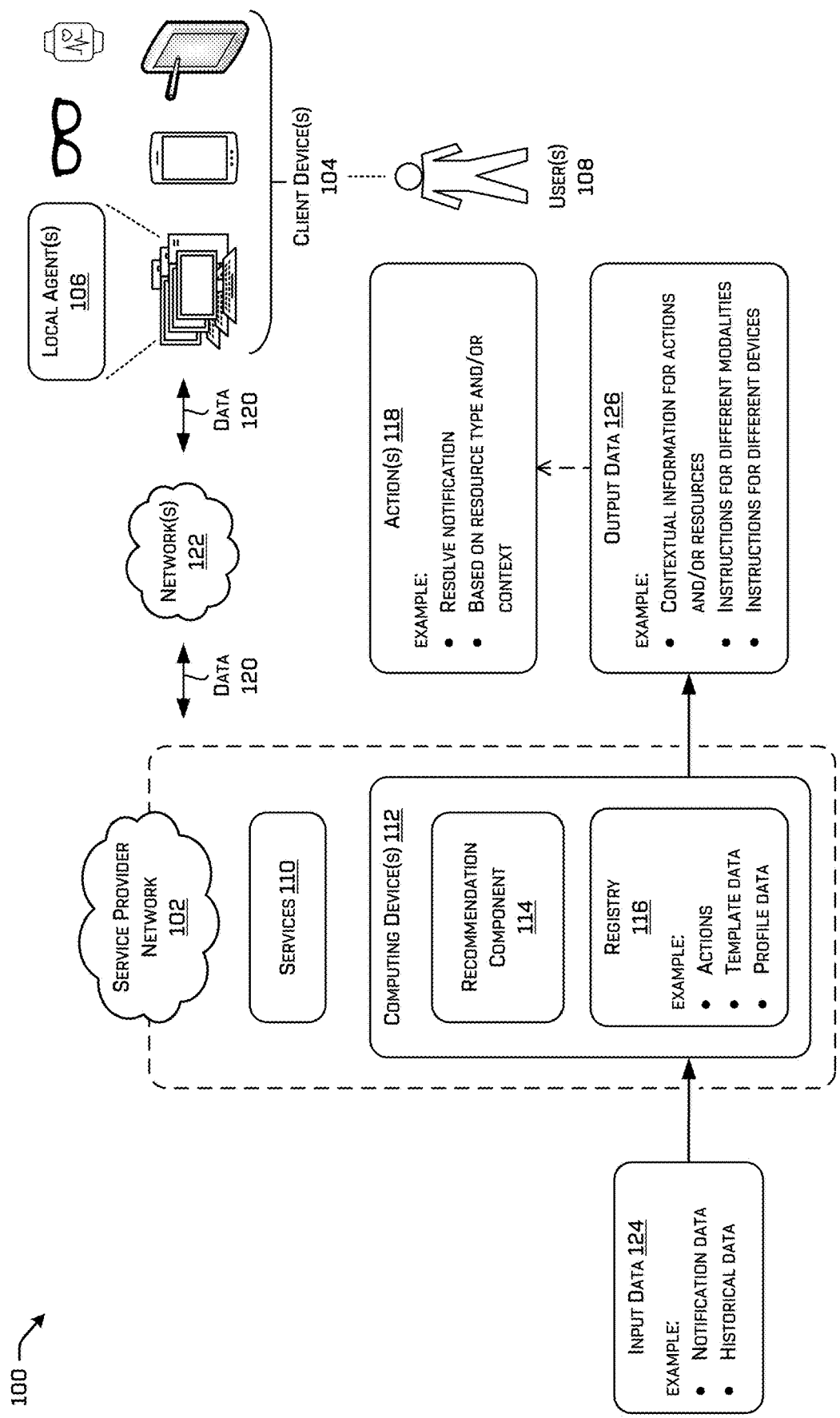
FIG. 1 illustrates a system-architecture diagram of an example environment for managing a recommendation associated with a service provider network.

This disclosure relates to techniques for recommending actions that resolve a notification associated with a resource in a cloud computing environment. For example, a system can implement a notification component that provides centralized management of actions for presentation on various devices independent of a type of interface, operating system, data format, etc. used to receive, process, and/or present the actions. In some examples, the notification component can receive a notification associated with a resource and access data from a registry usable to identify potential actions that remedy the notification. The system can implement a recommendation component to receive the data from the registry and identify contextual actions for the notification (e.g., an additional related action). The recommendation component can also or instead determine computer-readable instructions for presenting the actions for a particular interface modality. In various examples, the system can determine recommendation data that includes the actions and the computer-readable instructions, and transmit the recommendation data proactively to one or more devices regardless of platform, device type, operating system, etc. associated with the one or more devices.

Generally, the system can receive data representing a notification associated with a service that operates in the cloud computing environment. The service can be associated with different types of resources that provide storage, processing, networking, monitoring, or machine learning functionality, etc. over the Internet to one or more computing devices associated with a user. The techniques described herein can include receiving notification data from a service, generating actions that address the notification (e.g., a response to an alarm notification, etc.), and outputting the actions as recommendation data on the one or more computing devices. In various examples, the system can determine the actions and/or the recommendation data for use with varying types of devices, interfaces, operating systems, and so on.

In some examples, the system can configure data associated with a service or resource for presentation on a user interface. For example, the user interface associated with a mobile application may require different computing instructions to present recommendation data on an interface associated with a console, Chatbot, mobile device, or other interface type. Further, an account or end-user may be associated with multiple services and the techniques described herein can enable the end-user to manage notifications for the multiple services through a single system. For instance, using the techniques described herein, a centralized computing device can manage notifications for different services and resources, and configure data for multiple interface types to proactively present a response for the notification that would otherwise not be possible using typical systems.

By way of example and not limitation, a first computing device can receive one or more resources over the Internet as a service(s), and a second computing device can manage notifications associated with the service(s). Managing the notifications can, for instance, include determining recommendations for responding to the notification as well as configuring the recommendations for output on different interfaces and devices. In this way, the first computing device (or a third computing device) can access recommendations, actions, etc. seamlessly independent of an interface (e.g., Chatbot, mobile, etc.) used by a user or component to access such data. The second computing device can also or instead configure respective data for presentation in multiple interface types associated with the first computing device. In various examples, the second computing device can access data from a storage device (e.g., a registry) that indicates respective computer-readable instructions for presenting various actions in two or more interface modalities of the first computing device. The second computing device can, for instance, implement a machine learned model trained to generate recommendations for resolving the notification based on the data from the storage device. In some examples, the storage device can store data (e.g., template data, etc.) representing information that associates actions with instructions for presenting the action (or other recommendation information) in a respective user interface modality. Further discussion of providing recommendations for responding to a notification can be found throughout this disclosure including in the figures below.

In various examples, a system can comprise a model to receive notification data from a device authorized to receive a service from a service provider network. The system can generate recommendations for the device to implement based on an output from the model. For example, a model can receive a message indicating a notification associated with a service (e.g., a threshold number of ports has been exceeded in web service, etc.) and generate actions for selection in a user interface (e.g., selectable recommendations to change a network setting, increase the threshold number, etc. to improve operation of the web service). By implementing the techniques described herein, a system can select actions that are relevant for each type of notification, and configure the notification for processing (e.g., presentation, etc.) on different interface modalities.

In some examples, the system can represent a streaming recommendation service that is configured to manage recommendations for notifications associated with a service provider network. For example, the system can include one or more computing devices receiving notification data from a client device (or database associated therewith) indicating that the client device received a notification associated with a service. In some examples, the one or more computing device can implement a model or component to determine a context between previous recommendations across different services and/or regions of the service provider network when determining a current recommendation for a particular service.

The system can represent or otherwise utilize a cloud platform that provides or hosts various types of services (also referred to as backend service). For instance, backend services may include an advertising service, business-application services, financial-institution services, healthcare services, and so forth. Client devices often interact or access these backend services over a network, such as the Internet, using Application Program Interface (API) calls that define an operation or interaction that the client device is requesting be performed. For example, an application or agent may be running locally on a client device to watch a video, make a purchase, etc. Data associated with the cloud platform can be used as input data to one or more models as described herein.

The system can employ a variety of different models to perform the recommendation techniques described herein. As described herein, a model may be representative of a machine learned model, a statistical model, a heuristic model, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

In various examples, the service provider network may comprise clusters of managed servers stored in data centers located across geographic areas. The service provider network may be a distributed network through which users (often customers) may interact via respective client devices to manage or otherwise interact with services provided by the service provider network.

The techniques discussed herein can improve functioning of a computing device in a variety of ways. For example, the computing device can implement a model or component to reduce an amount of data transmitted over a network to manage recommendations associated with a notification (e.g., by proactively providing data for processing by different modalities, operating systems, data formats, etc. independent of receiving a request for a specific modality, etc.). In some examples, the techniques described herein can improve the quality of data transmitted using a service provider network by reducing an amount and/or number of data exchanges to determine actions for responding to notifications. For example, actions for responding to notifications in various modalities can be transmitted in a single communication, and the actions can have improved context for resolving the notifications. Outputs by the computing device can be generated in less time and provide more accurate recommendations compared to not implementing the model or components and/or relying on human input to validate such recommendations. The recommendation data can also identify contextual relationships between respective actions to recommend an action for a particular modality, operating system, and so on.

In some examples, the computing device can implement a model or component to optimize use of available network bandwidth and/or computational resources when determining recommendation data, actions, context, and so on. The techniques can, for instance, include the model or the component optimizing available computational resources by performing operations that limit the impact on the available resources (as compared to not implementing the model). Further, a number of operations associated with receiving and processing user inputs (e.g., to request information from a different device or modality) can be avoided thereby freeing up such computational resources for use by the computing device.

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

FIG. 1 illustrates a system-architecture diagram of an example environment 100 for managing a recommendation associated with a service provider network. For example, a service provider network 102 can generate actions for mitigating a notification of a service associated with one or more client device(s) 104. The client device(s) 104 can include one or more local agents 106 representing one or more interfaces for interacting with the user 108 (e.g., outputting data for presentation, receiving data from the user 108, and so on).

As shown in FIG. 1, the service provider network 102 comprises services 110 and one or more computing device(s) 112 that further comprise a recommendation component 114 and a registry 116. In some examples, the computing device(s) 112 can determine an action(s) 118 associated with the notification and configure the action(s) 118 for presentation in different modalities. In some examples, the client device(s) 104 can exchange data 120 over a network 122 as part of one of the services 110 of the service provider network 102. The data 120 can, in some examples, represent a notification, user preferences associated with a receiving a notification, a request for a recommendation, or a recommendation to resolve the notification, just to name a few.

The action(s) 118 can represent data that causes a response to the notification. For example, an action can include changing a setting for a device to cause the device to remedy the notification (e.g., change a network setting to improve network thruput to resolve a notification indicating a network problem). An action may also or instead include not changing a setting of the device and resolving the notification by selecting an action included as recommendation data (e.g., the data 120) indicating to not change settings, parameters, etc. of the device.

In some examples, the action(s) 118 can include an action provided by the client device(s) 104 such as an action provided, defined, or otherwise determined by the user to implement for a notification. In some examples, the user(s) 108 and/or a model of the client device(s) 104 can determine an action for responding to a notification based on historical notifications, historical actions, etc., and send the action to the computing device(s) 112 for consideration in response to receiving a future notification matched to a specific action. In some examples, the action can include an API call provided by the client device(s) 104 and/or the user(s) 108.

In some examples, the computing device(s) 112 can receive input data 124 for processing, and determine output data 126 usable by the recommendation component 114 (or other component) to determine the action(s) 118 for resolving the notification. In some examples, however, output data 126 can represent or otherwise include the action(s)118 without further processing by the recommendation component 114. For instance, the computing device(s) 112 can implement the recommendation component 114 to receive a notification associated with the client device 104 and request data from the registry 116. The registry 116 can, in various examples, provide data representing actions for different modalities, devices, etc. to the recommendation component 114. In some examples, at least some of the data from the registry 116 can be used as the output data 126. Additionally, or alternatively, the recommendation component 114 can input the data from the registry 116 into a model (e.g., a machine learned model) that generates the output data 126. For example, the model can determine a subset of the actions from the registry 116 and/or a ranked list of the actions from the registry 116 as the output data 126.

In various examples, the recommendation component 114 can configure one or more messages for transmission over the service provider network 102 to the client device(s) 104. For instance, the recommendation component 114 can configure messages for transmission that comprise different portions of the output data 126 (e.g., computer-readable instructions for different modalities and/or devices). For example, a first message can include first instructions for a first modality and second instructions for a second modality for presenting the action(s) 118 on a respective local agent 106 of the client device 104. In some examples, the first instructions or the second instructions can comprise a respective action description language for the first modality or the second modality.

A second message may be configured to include instructions for presenting the action(s) 118 on a local agent of a mobile device, wearable device, tablet device, console device, or other device accessible by the user 108. In some examples, the action(s)118 can be configured for various modalities or device types independent of receiving a request from the client device(s) 104 and/or the user(s) 108 to configure the action(s). That is, the computing device(s) 112 can represent different types of devices accessible by a same user or different users, and the output data 126 can include instructions that enable presentation of the action(s) 118 on multiple device types and/or interface modalities.

In some examples, the service provider network 102 may comprise clusters of managed servers stored in data centers located across geographic areas. The service provider network 102 may be a distributed network through which users (often customers) may interact via the client device(s) 104 to manage or otherwise interact with services 110 provided by the service provider network 102. The service provider network 102 may be managed by a service provider, and may provide various types of services 110, such as a video service, an on-demand computing service, an advertising service, a message-queuing service, a managed-database service, a software-execution service, application-hosting services, business-application services, financial-institution services, and/or other services. The services 110 may be a collection of computing resources configured to instantiate VM instances, containers, network functions, etc., and to provide other types of computing resources on demand. Other applications for the services 110 may be to support database applications, electronic commerce applications, business applications and/or other applications. The services 110 may include a social media service that can operate across different platforms, devices, interfaces, etc., and the computing device(s) 112 can identify action(s) to resolve notifications that are or may affect operation of the social media service.

The client device(s) 104 may represent any type of computing device capable of connecting to the service provider network 102 via a suitable data communications network(s) 122 (e.g., a third-party network) such as, but not limited to, a laptop or desktop computer, a tablet computing device, a television, a server computer, a vehicle, a watch, a wearable device (sunglasses), or a mobile telephone, just to name a few. Administrative users employed by the operator of the service provider network 102, such as administrators managing the operation of the service provider network 102, might also connect with, manage, and utilize resources provided by the service provider network 102 in a similar fashion (e.g., using the computing device(s) 112).

According to the techniques described herein, user(s) 108 of the service provider network 102 may subscribe for an account with the service provider network 102 to utilize the computing infrastructure (e.g., computing resources in data centers) supporting the services 110 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 110.

Generally, the user(s) 108 may interact via the local agent(s) 106 to receive or employ a service from the services 110. The user(s) 108 may be one or more of individual users, groups of users, organizations, businesses, or other entities that interact with the service provider network 102 via respective client device(s) 104. In some examples, the local agent(s) 106 can represent software that is associated with the services 110. The local agent(s) 106 may also, or instead, represent a user interface having one or more controls (or input controls) for the user 108 to provide input usable by the recommendation component 114 to generate, update, or otherwise output recommendations associated with a service. For instance, the user 108 can provide input to one or more controls of the local agent(s) 106 to log into a service and/or provide preferences related to a presentation (e.g., the data 120) on a display device of the client device(s) 104.

The services 110 described above, and any other services, may be provided in one particular implementation by one or more data centers operated by the service provider. As known to those skilled in the art, data centers are facilities utilized to house and operate computing resources, such as computer systems and associated components. Data centers may also include redundant power, communications, cooling, and security systems. The data centers might be located in geographically disparate regions, and might also be connected to various other facilities, such as co-location facilities, and various wide area networks ("WANs"), such as the Internet.

The computing resources associated with the services 110 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 110 in the service provider network 102 might also provide functionality for automatically scaling and/or de-scaling the computing resources based upon demand for the resources and/or other factors. In this way, a recommendation service providing the techniques described herein can be scaled to account for additional notifications, device types, interface modalities, and so on.

In some examples, the recommendation component 114 can perform a variety of operations to manage a notification including receiving notification information from a device having a first device type or interface type, identifying contextually related actions, and generating recommendation data (e.g., the output data 126 and/or the action(s) 118) for a second device type or interface type, just to name a few. A notification can be associated with a resource implemented by a service, and the action(s) 118 can be based at least in part on a resource type and/or the determined context of an action relative to another action. Additional details of the recommendation component 114 can be found elsewhere including the FIGS. 2-7.

In some examples, the recommendation component 114 can implement one or more models to determine a subset of actions for sending to the client device(s) 104 to present the subset of actions and optionally receive a selection to implement an action from the subset of actions from one of a) a model or component of the client device 104, or b) the user 108.

In various examples, the computing device(s) 112 can receive initial data (e.g., the data 120 at a particular time) comprising user preferences for receiving recommendations. That is, the recommendation component 114 can receive an indication of the types of interfaces or devices preferred by a user, and automatically configure the action(s) in different data formats corresponding to the different types of interfaces or devices.

The recommendation component 114 can, in some examples, monitor data exchanged over the service provider network 102 continuously, and aggregate notification data from one or more sources at different times as the input data 124. Additionally, or alternatively, the recommendation component 114 can determine which time periods, sources, geographical regions, etc. to collect data for determining a contextually related recommendation for a notification in a particular geographical region or associated with a certain service. In some instances, the recommendation component 114 may access data from the registry 116 representing previously analyzed notifications, network activity for different time periods, and actions that resolved the previous notifications, just to name a few.

In various examples, the service provider network 102 can implement the registry 116 to store various types of data. The registry 116 can represent a computing device, a storage device, database, or the like. In some examples, the registry 116 can receive or store data from client devices associated with different geographic regions, a data center, a computing device associated with the service provider (e.g., the computing device(s) 112), and/or a service of the services 110 for storage. For example, the registry 116 can store actions for responding to a particular notification, profile data associated with a user, and/or template data associating various actions and notifications. The profile data can, for example, represent user preferences associated with receiving notifications (e.g., a preferred modality, a list of prioritized actions for responding to particular, etc.). In various examples, the template data can be stored in a data format that optimizes storage and/or retrieval to present the actions for consideration by a model, and/or the user 108.

In various examples, one or more components can include or access the registry 116 (e.g., and/or the database 508 of FIG. 5), a container registry, a memory, or other storage device to store the various types of data usable for implementing the techniques discussed herein. Some stored data can be used as input data (or training data) into a model (or machine learned model) as described herein.

As mentioned, the action(s) 118 can be based at least in part on a resource type associated with the notification in the input data 124. For instance, the recommendation component 114 can receive the data from the registry 116 (e.g., template data) and generate a subset of actions from the actions included in the data based on a type of resource identified in the input data 124. A resource type can vary according to whether the resource is associated with a particular service or functionality. A resource type, identifier, name, or the like can be included in the notification such as in a data field to indicate which resource is associated with the notification. A resource may be associated with a memory, processor, API, service, database, etc. for using in the cloud computing environment. By way of example and not limitation, the resource can be associated with a service that provides processing, memory, storage, and/or networking capacity and the resource types can vary according to whether the service provides processing, memory, etc.

In some examples, the input data 124 can represent notification data associated with one or more notifications generated in association with one or more services (e.g. the services 110). The notification data can, for instance, represent notifications intended for presentation, or previously presented, on a client device. The client device can, for example, transmit the notification data to the computing device(s) 112 for determining the output data 126. In some examples, the recommendation component 114 and/or the registry 116 can receive historical data associated with the client device 104 (e.g., notifications, resource activity, and/or contextual determinations at a previous time, etc.) and/or the user 108 (e.g., user behavior determined by a model over time, preferences provided by the user 108, previously selected actions, previously used modalities and/or devices, etc.).

Historical resource information can indicate a state of the resource at a particular time, such as when the resource is associated with a notification, an action, an so forth, at a previous time. The state of the resource can indicate one of: an open state, a closed state, an in-progress state, a pending state, a running state, or a stopped state, though other states may also or instead be used (e.g., depending upon a resource type). The state of the resource can indicate whether the resource (or an action associated therewith) is open, closed, in-progress, pending, and so on. For instance, a first resource type can be associated with an open and closed states while a second resource type can be associated with a running state or a stopped state. The resource state may be stored as part of resource metadata accessible for processing by one or more components described herein. In various examples, a model or component can process the state information and/or the historical resource information as a portion of input data (e.g., part of the input data 124) usable for determining recommendations for a current notification associated with the resource. In some examples, the state of the resource can be considered when determining an action for a notification in the notification data.

In various examples, the action(s) 118 can be determined based at least in part on an output from the recommendation component 114 (e.g., the output data 126 as indicated by a dashed arrow in FIG. 1). For example, the recommendation component 114 can be configured to determine contextual information (e.g., a relationship) among actions, notifications, and/or resources over time. The contextual information can be used to identify an action for a resource that can potentially resolve the notification. In some examples, the action can be in addition to a set of actions included in the data from the registry 116. In such examples, the recommendation component 114 can determine the output data 126 to represent a subset of actions based on the contextual information.

In some examples, the recommendation component 114 can configure a message for sending to the client device(s) 104 that includes at least a portion of the output data 126. In some examples, the client device(s) 104 can, responsive to receiving the message, present the recommendations in a first interface associated with a first modality and/or in a second interface associated with a second modality. For example, the recommendations can be output for display on a display device or in a user interface to optionally receive selection of one of the action(s) 118 by the user 108. In various examples, the user 108 may change between modalities by accessing different devices, applications, or interfaces and using the techniques described herein can enable the user 108 to resolve the notification regardless of the device or modality accessed.

In some examples, the output data 126 can be sent to a model or component associated with the client device(s) 104 and the model or component can select an action based on the output data 126 independent of requiring input from the user 108. For example, a machine learned model can receive the output data 126 and select one or more actions for the client device(s) 104 and/or an associated service to implement to resolve the notification.

Though FIG. 1 shows the recommendation component 114 and the registry 116 separately for discussion purposes, functionality associated with the recommendation component 114 or the registry 116 can be included in the recommendation component 114, or another component or device of the service provider network 102.

Figure 2:
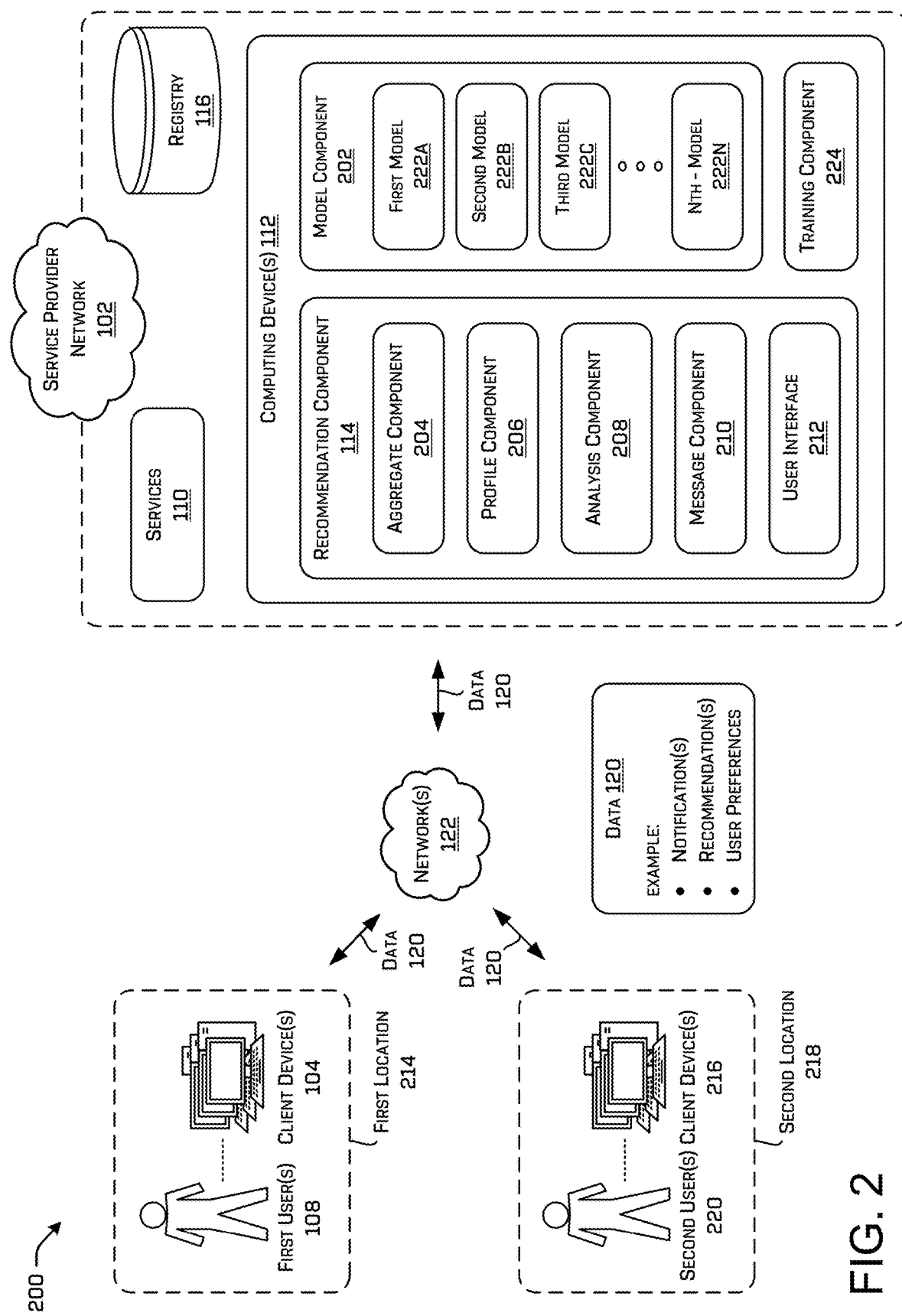
FIG. 2 illustrates a diagram of an example service provider network implementing example components to perform the techniques described herein.

FIG. 2 illustrates a diagram 200 of an example service provider network implementing example components to perform the techniques described herein. For example, the service provider network 102 can implement the computing device(s) 112 and the services 110, the recommendation component 114, and the registry 116 of FIG. 1. As shown in FIG. 2, the computing device(s) 112 comprises a model component 202 and the recommendation component 114 which further includes an aggregate component 204, a profile component 206, an analysis component 208, a message component 210, and a user interface 212. Though depicted in FIG. 2 as separate components, the functionality associated with the aggregate component 204, the profile component 206, the analysis component 208, the message component 210, and/or the user interface 212 can be included in a different model, component, or device associated with the service provider network 102 (e.g., a single model). In some instances, the components described herein may comprise a pluggable component, such as a virtual machine, a container, a serverless function, etc., that is capable of being implemented in any service provider network and/or in conjunction with any API gateway.

The diagram 200 further depicts the data 120 being exchangeable between the service provider network 102 (e.g., the computing device(s) 112), the client device(s) 104 associated with a first location 214 and/or the client device(s) 216 associated with a second location 218 using the network(s) 122. Client device(s) 216 can be associated with a second user(s) 220 and the second location 218 can include or be associated with a different geographical region, Content Delivery Network, data center, and so on. Regardless of location, the client device(s) 104 and/or the client device(s) 216 can receive data associated with the services 110.

In some examples, the data 120 can represent a portion of the input data 124 and/or a portion of the output data 126 of FIG. 1. For example, the data 120 can be associated with a recommendation service (e.g., one of the services 110) and can include notification(s), recommendation(s), and/or user preferences, just to name a few. In some examples, the data 120 can include a notification sent by the client device for analysis by the recommendation component 114 while in other examples the data can include recommendation data transmitted by the computing device(s) 112 to devices in the first location 214 and/or the second location 218.

In some examples, the recommendation component 114 (or components thereof) and/or the model component 202 (or models thereof) can receive the input data 124 of FIG. 1 for processing, and generate the output data 126. The recommendation component 114 can, in some examples, transmit recommendation data (e.g., the action(s) 118) to different client device types and/or interface modalities (e.g., associated with a single client device or different client devices).

As shown in FIG. 2, the model component 202 includes one or more models, such as a first model 222A, a second model 222B, a third model 222C up to an Nth model 222N (collectively "models 222"), where N can be any integer greater than 1. The models 222 may be stored on, or otherwise accessible by, memory associated with the computing device(s) 112. The models 222 may represent machine learned models, statistical models, heuristic models, or a combination thereof, and may be implemented in association with a component of the computing device(s) 112.

In some examples, the first model 222A can determine contextually related actions for consideration as output data. For instance, the first model 222A can determine a first value representing a likelihood to use a first action to resolve the notification and a second value representing another likelihood of using a second action, or third action, etc. In various examples, the second model 222B can determine a relationship between the actions based on the likelihood having greater detail than the output by the first model 222A. By identifying contextually related actions, improved recommendations can be provided by a recommendation system (relative to not implementing the techniques).

The aggregate component 204 can represent functionality to aggregate data from various sources associated with the service provider network 102. In some examples, the aggregate component 204 can implement a machine learned model trained to aggregate relevant data from a device (e.g., a service, a backend service, a client device, a server, a data center, a Content Delivery Network, and the like) associated with the service provider 102. For instance, the aggregate component 204 can retrieve, select, or otherwise receive notification data, historical data, user preference data, network activity data, etc., for implementing the techniques described herein.

The profile component 206 can be configured to store, access, or update user data associated with a user of a client device and/or network data associated with network behavior for different times. For example, the profile component 206 can store user data describing user behavior, user preferences regarding presentation of a notification, and/or a recommendation, just to name a few. In various examples, the profile component 206 can also or instead maintain a network profile that indicates notification behavior for different periods of time (e.g., showing previous notifications, solutions, etc. for different times). In some examples, output from the profile component 206 can be used as training data to train a machine learned model.

In some examples, the profile component 206 can store information associated with a user that can include information about multiple client devices with which the user can interact with the services 110. The user 108 can receive the data 120, for instance, via a mobile phone, a desktop computer, a particular application, a television or other device, and a profile can include information about previous user behavior and/or network activity, recommendations associated with a particular device of the user, etc. In this way, information can be available to another component or model for training or determining recommendations at a greater level of granularity (versus not implementing the profile component 206, for example).

The profile component 206 can output user data to another component, such as the model component 202 and/or the analysis component 208 for consideration during management of the notification (e.g., identifying a subset of actions for sending to a client device), as discussed herein.

The analysis component 208 can represent functionality to analyze data associated with the service provider network 102 such as notifications, actions, and so forth. In some examples, the analysis component 208 can represent functionality to generate the output data 126 including, for example, determining a context between actions to output the most relevant actions for an interface or device.

In some examples, the analysis component 208 can implement a machine learned model to detect contextual information between entities (e.g., notifications, actions, recommendations, and the like). Contextual information can include attributes that describe a type of relationship between entities. In various examples, the analysis component 208 can implement a graph model to identify connections between a) an action used for a first notification, b) another action for a related notification, or c) a new action not previously used, just to name a few. For instance, the graph model can determine a set of nodes to represent different entities and apply a data structure algorithm to the set of nodes to identify connections between respective nodes in the set of nodes. Based at least in part on applying the data structure algorithm to the set of nodes, the graph model can determine one or more contextual relationships between nodes. For instance, actions can be related based on having success at resolving a notification, for example. In this way, the graph model can use lengths of edges to determine relatively stronger and/or weaker relationships, and entities corresponding to various "related" nodes can indicate a set of actions to provide as recommendation data to resolve the notification.

The graph model can, in some examples, generate output data representing a data structure, a knowledge graph, or the like, that represents a relationship between actions. In various examples, the graph model can detect, identify, or otherwise determine connections among an action, a notification, a resource, and/or a service. For example, the graph model can generate a graph representation between a first action and a second action, and optionally a third action not included in the data from the registry 116 that are related (e.g., based on criteria received as input). For instance, the third action can be determined based on input from a client device identifying a user defined action, an API call, or other criteria.

In some examples, the graph model can determine a first node to represent the first action, a second node to represent the second action, a third node to represent a third action, and so on up to a threshold number of nodes. The graph model can, for example, apply an algorithm to the first node, the second node, and the third node to identify a connection between the first action, the second action, and the third action. In various examples, the output data 126 can be determined based at least in part on the connections and may include the third action as a contextual connection that is not explicitly identified in the template data from the registry.

The analysis component 208 can represent functionality to determine recommendation data associated with a notification provided by a service. In some examples, the analysis component 208 can receive output data from one or more models, and determine the most relevant actions for responding to the notification. For example, the analysis component 208 can receive contextual information from a machine learned model and/or relationship data from a graph model as input, and further receive user data (e.g., from the profile component 206) to determine whether or not to include an action in the output data 126.

The message component 210 can represent functionality to generate, configure, or exchange a message between the computing device(s) 112 and another device such as the client device(s) 104 and/or the client device(s) 216. For example, the message component 210 can configure a message for sending to the client device(s) 104 based on the analysis component 208 determining the output data 126 for a particular notification. The message can be included in the data 120 to notify the client device(s) 104 of potential actions for resolve the notification. The message component 210 can also or instead generate a message for sending to a device to cause presentation of the output data 126 in various modalities.

Generally, the user interface 212 represents functionality for the service provider network 102 to interface with a user of a device via one or more programmable controls that convey information and/or optionally receive input. In various examples, the user interface 212 can be associated with the client device(s) 104, the client device(s) 216 and/or the computing device(s) 112. In some examples, the user interface 212 can cause data to output on a display device of a respective device to present at least a portion of the output data 126 (such as by inclusion the data 120). The user interface 212 may also present options (selectable controls, interfaces, and the like) for a user to select an action(s) for the notification, manage user preferences, or otherwise receive the data 120. Outputs from various components or models can be presented in a user interface to implement the techniques described herein.

In some examples, the user interface 212 can be configured to present data associated with the service provider network 102 on a display device of the client device(s) 104 including presenting notifications associated with a potential incident impacting operation of a service or a device. In various examples, a user (e.g., an administrator) may determine an action relative to the notification (e.g., take no action, modify an entity of the service provider network, validate parameters for a service, etc.).

The computing device(s) 112 can include a training component 224 to provide functionality to train a machine learning model usable to implement one or more of the techniques discussed herein to determine a recommendation, an action, etc. In some examples, the training component 224 can include training data that has been generated by one or more machine learned models or components described herein. For example, the training component 224 can receive historical action information or contextual information associated with the output data 126, notifications, etc. for use as training data (e.g., to improve contextual action predictions over time). Third-party labeled training data can also or instead be used for training in various examples.

In some examples, the computing device(s) 112 can implement the training component 224 to improve recommendations to notifications by a machine learned model over time. For instance, a machine learned model can be trained to associate various actions according to provided criteria (e.g., user or administrator preferences) or criteria determined from a model or component. In some examples, ground truth may be determined over time to capture current and past action associations for consideration by the machine learned models (either hand labelled or determined by another machine learned model) and such ground truth may be used to determine additional context between actions as new actions and notifications occur over time.

By way of example and not limitation, the computing device(s) 112 can configure actions for responding to notifications associated with one or more of the services 110 independent of an interface type or device type receiving the actions. The computing device(s) 112 can, for example, configure respective data for presentation in two or more interface types associated with one or more client devices. The computing device(s) 112 can, in various examples, receive (e.g., from the registry 116), generate, or otherwise determine computer-readable instructions for presenting various actions in at least one interface type or device type that is different from the interface or the device associated with the notification. Using the techniques described herein, different client device types (e.g., mobile device, console device, wearable device, etc.) can receive computer-readable instructions for presenting the actions to enable the client device(s) (or a user thereof) to receive the actions. In some examples, a machine learned model can be trained to generate contextual actions presentable as recommendations for resolving notifications on specific interfaces and/or devices. For instance, actions, instructions, and the like can be sent to various client devices prior to receiving an explicit request form a respective client device for the actions (e.g., before a user launches an application to manage notifications on a client device).

In some examples, the computing device(s) 112 can represent a centralized system for managing notifications for different services of a service provider. A social media service, a financial service, or other service, can require different computer-readable instructions for presenting actions to resolve notifications. The techniques described herein can provide contextual actions for notifications that are associated with the different services of the service provider. In some examples, a machine learned model can be trained using training data received from different services to determine the actions. In this way, predictions by the machine learned model (e.g., contextual relationships among actions) can be improved over time versus training the machine learned model using training data from a single service.

Figure 3:
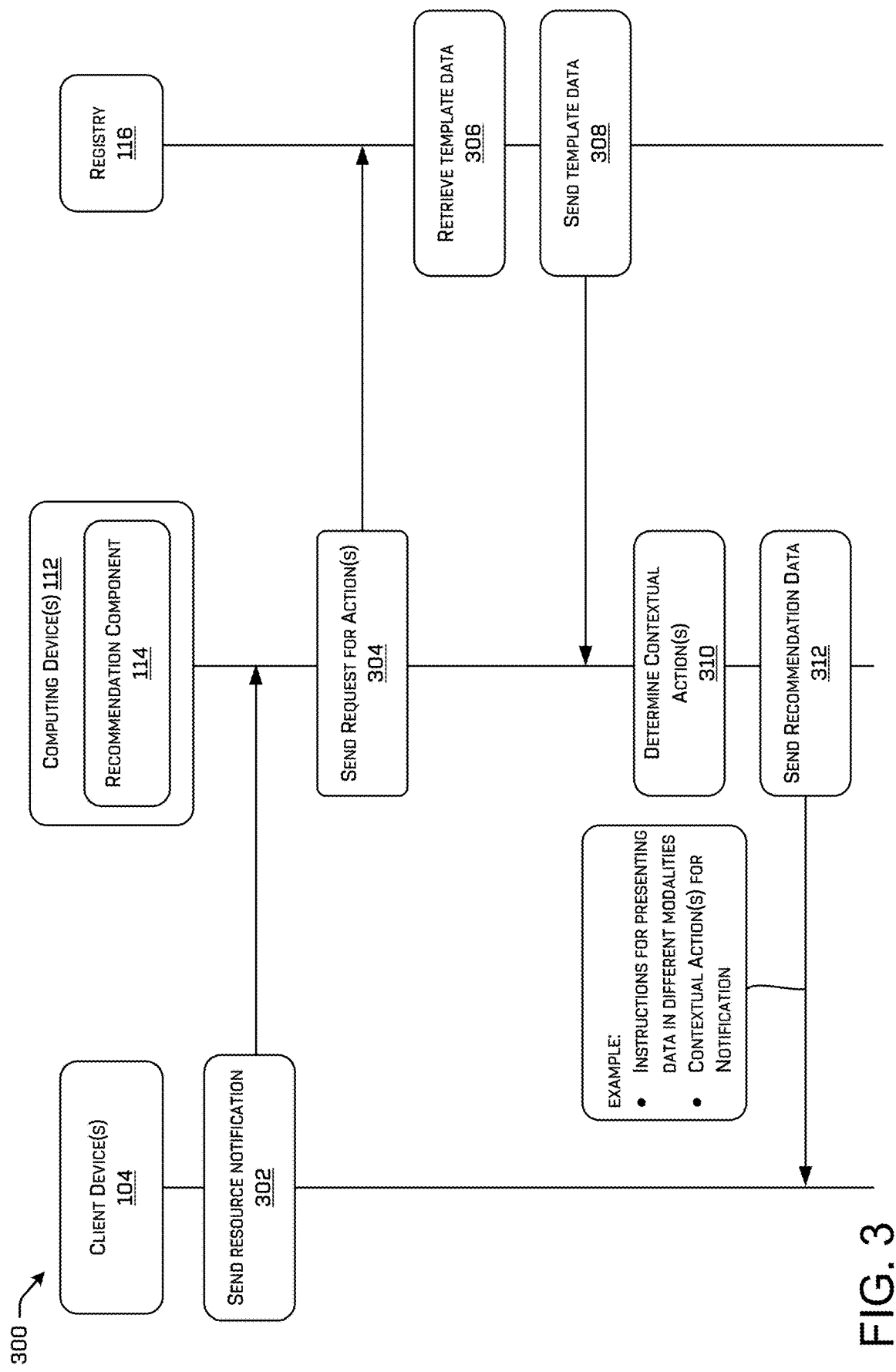
FIG. 3 is a messaging flow for determining recommendation data by an example server in an example environment.

FIG. 3 is a messaging flow 300 for determining recommendation data by an example server in an example environment. For example, the service provider network 102 can implement the computing device(s) 112 and the recommendation component 114 of FIG. 1 to determine contextual actions for resolving a notification associated with a service or resource.

At 302, the client device(s) 104 can send a resource notification to the computing device(s) 112. For example, a notification associated with a resource of the service provider network 102 can be transmitted over the service provider network 102 for analysis by the computing device(s) 112. In some examples, the resource notification can be received from a service or other device directly (e.g., the service can send the notification to the computing device(s) 112 independent of requiring the client device(s) 104 to send the notification).

At 304, the computing device(s) 112 can implement the message component 210 to configure a message for sending to the registry 116 requesting actions for responding to the resource notification. For instance, the message component 210 can transmit a message requesting data associated with the resource notification, such as actions for responding to, resolving, and/or mitigating the resource notification. In various examples, the client device(s) 104 can implement one or more of the actions to resolve an impact associated with notification on operation of the client device, or an ability for the client device to receive and/or provide a service of the services 110.

At 306, the registry 116 can retrieve template data associated with the resource notification. For instance, the registry 116 can store data representing one or more of: actions for resolving different notification types, computer-readable instructions for presenting the actions in a respective interface, computer-readable instructions for presenting the actions in a respective device type, and so on.

At 308, the registry 116 can send the template data representing actions for different modalities, devices, applications, etc. to the recommendation component 114. For example, the template data can comprise actions and instructions for enabling various modalities to process the actions. The instructions can represent computer-readable instructions executable by a processor to cause presentation of the actions in a particular modality.

At 310, the recommendation component 114 can determine contextual action(s) associated with the resource notification. For example, a machine learned model can receive the template data as input, and optionally other types of input data, and generate a set of actions for resolving the resource notification. In some examples, the machine learned model can identify a subset of actions from the template data to output as recommendation data for sending to the client device(s) 104 (e.g., the contextually related actions).

In various examples, the aggregated component 204 can access, retrieve, or otherwise determine data usable as input data to the recommendation component 114. In this way, the machine learned model may also receive profile data, historical actions, historical notifications, or other input data (e.g., the input data 124). For example, historical notifications and associated actions can be compared to the template data (or actions thereof) to identify the contextual actions for including as the recommendation data.

At 312, the computing device(s) 112 can send recommendation data to the client device(s) 104. In various examples, the recommendation data can include the subset of actions determined by the recommendation component 114 indicative of contextual actions, the template data (or portion thereof), computer-readable instructions to enable processing and/or presentation of the recommendation data on various interfaces and/or device types, and the like. In this way, the recommendation data can cause the client device(s) 104 to process and/or present the recommendation data regardless of an interface type or device type receiving the recommendation data for output.

Figure 4:
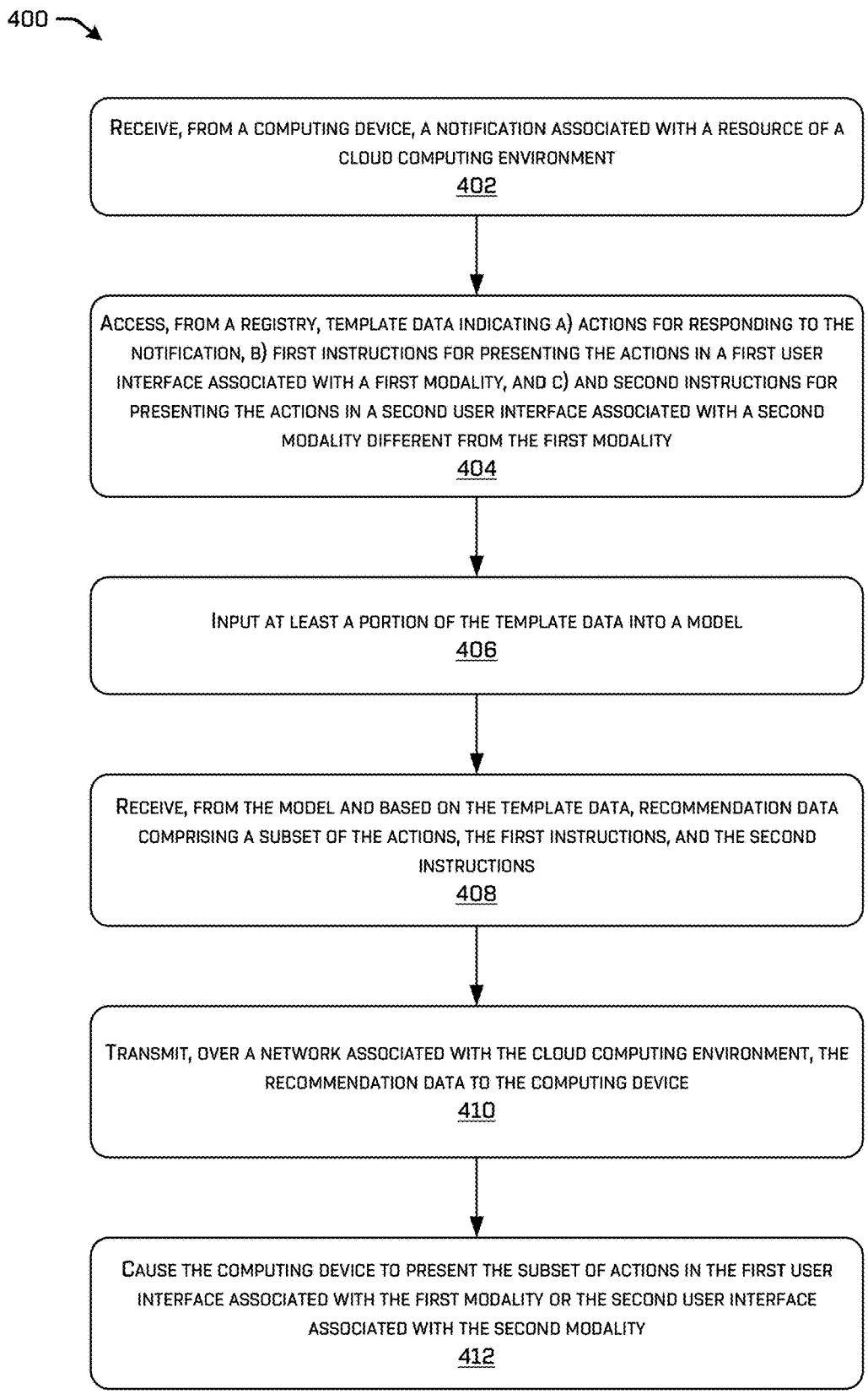
FIG. 4 is a flow diagram of an example method for determining a recommendation for responding to a notification.

FIG. 4 is a flow diagram of an example method 400 for determining a recommendation for responding to a notification. For example, the service provider network 102 can implement the recommendation component 114 and/or the model component 202 to determine actions for responding to a resource notification. The example method 400 can include recommending actions specific for different modalities and/or device types.

At 402, the computing device(s) 112 associated with the service provider network 102 may receive, from a computing device, a notification associated with a resource of a cloud computing environment. For instance, the recommendation component 114 can receive the input data 124 comprising a notification associated with a resource. The operation 402 can include, for example, receiving the notification from a client device (e.g., the client device(s) 104), a service (e.g., a security service), a component, a database, a registry, and so on.

At 404, the recommendation component 114 associated with the service provider network 102 may access, from a registry, template data indicating a) actions for responding to the notification, b) first instructions for presenting the actions in a first user interface associated with a first modality, and c) and second instructions for presenting the actions in a second user interface associated with a second modality different from the first modality. For instance, the recommendation component 114 can receive template data from the registry 116 comprising various actions and notifications as well as data format information, computer-readable instructions, and other information. The template data can include, for instance, a first data format for presenting the actions in a first interface (e.g., a first modality) and a second data format for presenting the actions in a second interface (e.g., a second modality), and so on for a threshold number of interfaces. In some examples, the threshold number of interfaces can be based on a resource type, a notification type, and/or available computation resources, just to name a few.

In various examples, the first modality and the second modality may utilize different communication channels for exchanging data associated with the notification (e.g., receiving the recommendation data. The recommendation component 114 can, for example, determine first instructions comprising a first domain-specific language for presenting the actions in the first user interface associated with the first modality and second instructions comprising a second domain-specific language for presenting the actions in the second user interface associated with the second modality.

In some examples, the registry 116 can provide user preference data, historical data (e.g., previous actions, notifications, etc. implemented by a client device), or other input data for use as input data by the recommendation component 114.

In some examples, the computing device(s) 112 can determine a resource type reference associated with the resource of the cloud computing environment, and provide the resource reference type to the registry 116 (e.g., in a message requesting the template data). For example, the message component 210 can transmit a message for sending to the registry 116 that includes the resource reference type. In this way, the registry 116 can access the template data from the registry is based at least in part on the resource type reference.

At 406, the recommendation component 114 associated with the computing device(s) 112 may input at least a portion of the template data into a model. For example, the recommendation component 114 can implement the model component 202 to receive some or all of the template data as input. Additionally, or alternatively, the model component 202 can receive user preference data, historical actions, historical notifications, etc. associated with part of the input data.

At 408, the computing device(s) 112 may receive, from the model and based on the template data, recommendation data comprising a subset of the actions, the first instructions, and the second instructions. For example, the model component 202 can determine which of the actions included in the template data to include as the recommendation data. In some examples, a machine learned model can determine a relationship among the actions included in the template data and determine the subset of actions based on the relationship. The recommendation data can also or instead include computer-readable instructions for presenting each of the subset of actions in two or more modalities, operating systems, data formats, communication channels, and so on. In some examples, the first instructions or the second instructions can comprise respective data formatting information, programming language, etc. for presenting the subset of actions.

The operation 408 can, in some examples, include implementing a graph model to receive the input data 124 and determine the output data 126 representing a contextual relationship between actions (e.g., a first action and a second action) as described herein.

At 410, the computing device(s) 112 may transmit, over a network associated with the cloud computing environment, the recommendation data to the computing device. For instance, the computing device(s) 112 can implement the message component 210 to configure a message comprising the recommendation data for transmission over the service provider network 102 to one or more client devices or interfaces associated therewith. The recommendation data can be transmitted at various times for output in association with various devices or interfaces. For example, fist recommendation data and second recommendation data can be sent to the client device 104 to enable the user 108 to interact with the fist recommendation data in a first interface (e.g., a console device) and the second recommendation data in a second interface (e.g., a mobile device).

At 412, the computing device(s) 112 may cause the computing device to present the subset of actions in the first user interface associated with the first modality or the second user interface associated with the second modality. For example, client device(s) 104 can, for example, receive the output data 126 from the recommendation component 114 representing respective instructions for presenting recommendations to resolve the notification. In various examples, different recommendations can be output to resolve a notification in various modalities without receiving a request to configure the data for a particular modality.

FIG. 4 illustrates a flow diagram of an example method that illustrate aspects of the functions performed at least partly by the service provider network 102 as described in relation to FIG. 1 and elsewhere. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 4 as described herein. These operations can also be performed in parallel, or in a different order than those described herein. Some or all of these operations can also be performed by components other than those specifically identified. For example, operations 406 and 408 may not performed in some examples, and the recommendation data can include at least some of the template data. Further, some examples may omit operation 412. Although the techniques described in this disclosure is with reference to specific components, in other examples, the techniques may be implemented by less components, more components, different components, or any configuration of components.

In some examples, the techniques of the method 400 may be performed by a system comprising one or more processors and one or more computer-readable media storing computer-executable instructions that, when executed by the one or more processors, cause the one or more processors to perform the operations of the methods.

Figure 5:
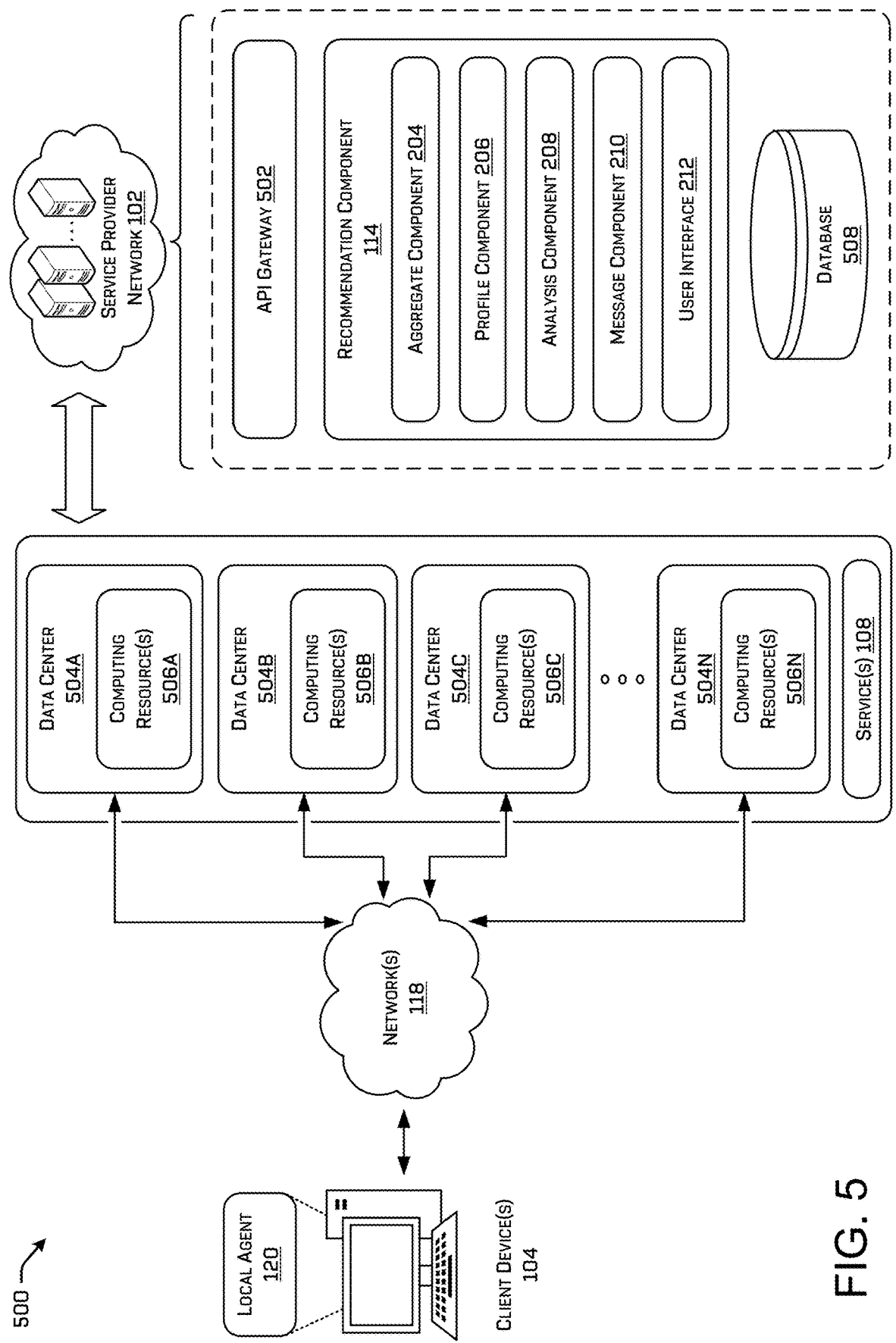
FIG. 5 illustrates a system and network diagram of an example operating environment that includes a service provider network for implementing the techniques described herein.

FIG. 5 illustrates a system and network diagram 500 of an example operating environment that includes a service provider network (that may be part of or associated with a cloud-based service network/platform) for implementing the techniques described herein. The service provider network 102 can include an API gateway 502 that may receive an API call and route the API call to a component or service. In various examples, the service provider network 102 can include the recommendation component 114 which comprises the aggregate component 204, the profile component 206, the analysis component 208, the message component 210, and the user interface 212.

The service provider network 102 can provide computing resources (e.g., computational resource(s) 506A, computational resource(s) 506B, computational resource(s) 506C up to an Nth computational resource(s) 506N (collectively "computational resources 506", where N can be any integer greater than 1) like VM instances, containers, serverless functions, storage, etc., on a permanent or an as-needed basis. Among other types of functionality, the computing resources 506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 508 for use in association with the notification management techniques discussed herein. The service provider network 102 can also be configured to provide other types of computing resources not mentioned specifically herein.

The computing resources 506 provided by the service provider network 102 may be enabled in one example by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative example for a data center 504 that can be utilized to implement the technologies disclosed herein will be described below with regard to FIG. 7.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 506 provided by the data centers 504 of the service provider network 102 over any wired and/or wireless network(s) 122 (utilizing a client device 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 122. It should be appreciated that a local-area network ("LAN"), the Internet, or any other networking topology known in the art that connects the data centers 504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 6:
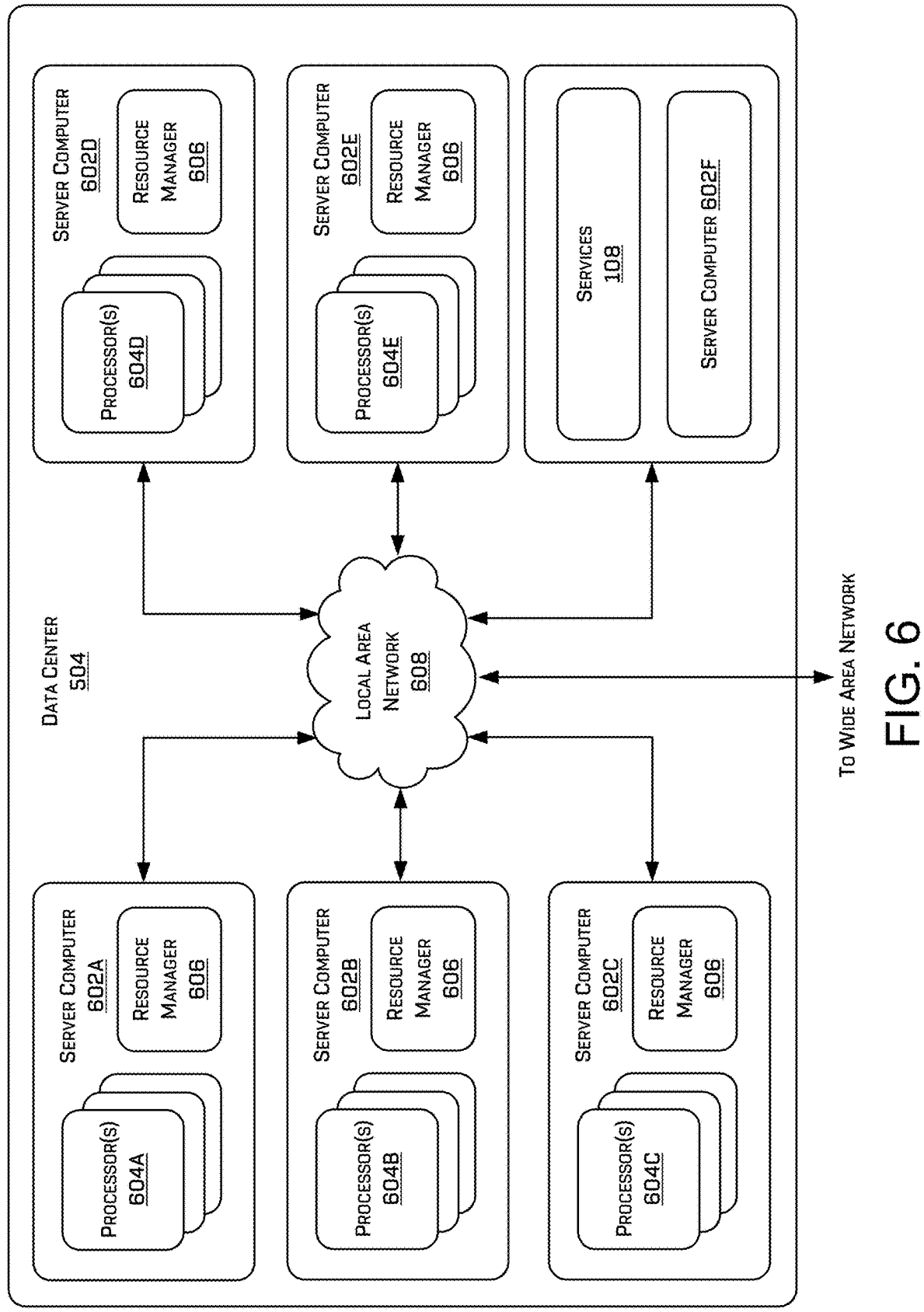
FIG. 6 is a diagram illustrating a configuration for an example data center that can be utilized to implement aspects of the techniques disclosed herein.

FIG. 6 is a diagram 600 illustrating a configuration for an example data center that can be utilized to implement aspects of the techniques disclosed herein. The example data center 504 shown in FIG. 5 includes several server computers 602A-602F (which might be referred to herein singularly as "a server computer 602" or in the plural as "the server computers 602") each having one or more processors 604A, 604B, 604C, 604D, and 604E. In some examples, the processor(s) 604 can represent a central processing unit (CPU), a graphics processing unit (GPU), a Tensor Processing Unit (TPU), an integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

The server computers 602 can be standard tower, rack-mount, or blade server computers configured appropriately for providing the computing resources described herein (illustrated in FIG. 6 as the processor(s) 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the services 110.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
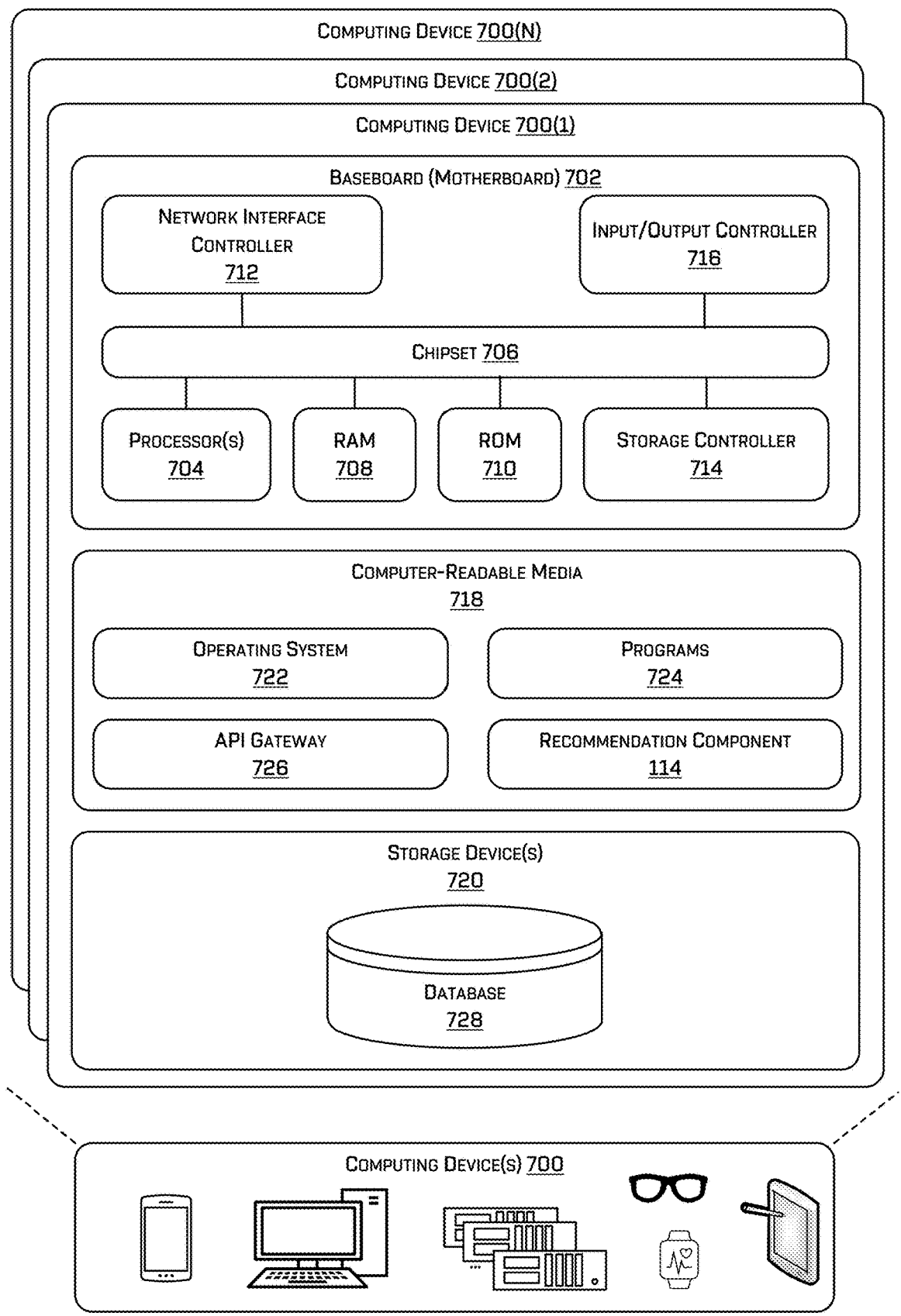
FIG. 7 is a computer architecture diagram showing an illustrative computer hardware architecture for implementing one or more computing devices to perform the techniques disclosed herein.

FIG. 7 is a computer architecture diagram showing an illustrative computer hardware architecture for implementing one or more computing devices 700 to perform the techniques disclosed herein. The computer architecture shown in FIG. 7 can include or represent a conventional server computer, workstation, desktop computer, laptop, tablet, network appliance, e-reader, smartphone, a vehicle, a watch, a wearable device (sunglasses), or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more processor(s) 704 (e.g., CPU, GPU, TPU, and the like) operate in conjunction with a chipset 706. The processor(s) 704 can be standard programmable processors that perform arithmetic and logical operations necessary for the operation of the computing device 700.

The processor(s) 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the processor(s) 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network(s) 122. The chipset 706 can include functionality for providing network connectivity through a network interface controller (NIC 712), such as a gigabit Ethernet adapter. The NIC 712 is capable of connecting the computing devices 700 over the network(s) 122. It should be appreciated that multiple NICs 712 can be present in the computing device 700, connecting the computer to other types of networks and remote computer systems.

The computing device 700 can be connected to one or more computer-readable storage media 718 storing software components for the computer device 700, and one or more mass storage devices 720 for storing data. The computer-readable storage media 718 can store an operating system 722, programs 724, the API gateway 726, and the training component 224, which have been described in greater detail herein. The mass storage device 720 can be connected to the computing device 700 through a storage controller 714 connected to the chipset 706. The mass storage device 720 can consist of one or more physical storage units. The storage controller 714 can interface with the physical storage units through a Small Computer System Interface ("SCSI"), a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 718 may store the components described herein as executable, computer-readable instructions. For instance, the components may include the API gateway 726, the model component 202, the recommendation component 114, or components associated with the recommendation component 114. The components may be stored and/or executed on a single server, or on a system of two or more computing devices 700.

The computing device 700 can store data on the mass storage device 720 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 720 is characterized as primary or secondary storage, and the like.

For example, the computing device 700 can store information to the mass storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the mass storage device 720 by detecting the physical states or characteristics of one or more particular locations within the physical storage units.

In addition to the mass storage device 720 described above, the computing device 700 can have access to the computer-readable storage media 718 to store and retrieve information, such as program modules, event structures, or other data. It should be appreciated by those skilled in the art that computer-readable storage media is any available media that provides for the non-transitory storage of data and that can be accessed by the computing device 700. In some examples, the operations performed by the service provider network 102, and or any components included therein, may be supported by one or more devices similar to computing device 700. Stated otherwise, some or all of the operations performed by the service provider network 102, and or any components included therein, may be performed by one or more computer devices 700 operating in a cloud-based arrangement. As shown, the mass storage device 720 may store the database 508 that includes information about meeting data, sensor data, user profiles, and services as well as rules and access policies.

By way of example, and not limitation, computer-readable storage media 718 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 720 can store an operating system 722 utilized to control the operation of the computing device 700. According to one example, the operating system comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It should be appreciated that other operating systems can also be utilized. The mass storage device 720 can store other system or application programs and data utilized by the computing device 700.

In one example, the mass storage device 720 or other computer-readable storage media 718 is encoded with computer-executable instructions which, when loaded into the computing device 700, transform the computer from a general-purpose computing system into a special-purpose computer capable of implementing the examples described herein. These computer-executable instructions transform the computing device 700 by specifying how the processor(s) 704 transition between states, as described above. According to one example, the computing device 700 has access to computer-readable storage media storing computer-executable instructions which, when executed by the computing device 700, perform the various processes described above with regard to FIGS. 1-7. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504 (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely (e.g., the operation 416). Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:
   one or more processors; and
   one or more non-transitory computer-readable media storing instructions executable by the one or more processors, wherein the instructions, when executed, cause the system to perform operations comprising:
   receiving, from a computing device, a notification associated with a resource of a cloud computing environment;
   accessing, from a registry, template data indicating a) actions for responding to the notification, b) first instructions for presenting the actions in a first user interface associated with a first modality, and c) and second instructions for presenting the actions in a second user interface associated with a second modality different from the first modality, wherein the template data is based on a resource type associated with the resource;
   inputting at least a portion of the template data into a model;
   receiving, from the model and based on the template data, recommendation data comprising a subset of the actions, the first instructions, and the second instructions, the recommendation data identifying a context between a first action and a second action of the actions;
   transmitting, over a network associated with the cloud computing environment, the recommendation data to the computing device; and
   causing the computing device to present the subset of the actions in the first user interface associated with the first modality or the second user interface associated with the second modality.

2. The system of claim 1, the operations further comprising:
   determining a first data format for presenting the subset of the actions associated with the first modality and a second data format for presenting the subset of the actions associated with the second modality;
   wherein the recommendation data includes the first data format and the second data format.

3. The system of claim 1, wherein the model is a graph model that is configured to output a graph representation between two or more of the actions associated with the template data, and the operations further comprising:
   receiving, from the graph model, output data representing the context between the first action and the second action; and determining the recommendation data based on the output data.

4. The system of claim 1, the operations further comprising:
inputting user preference data indicating a preferred action to perform for the resource;
inputting action data indicating a previous action performed in response to another notification associated with the resource at a previous time; and
determining the recommendation data based on the user preference data and the action data.

5. The system of claim 1, wherein:
the model is a heuristic model or a machine learned model,
the first modality and the second modality utilize different communication channels for exchanging data associated with the notification, and
the first instructions comprise a first domain-specific language for presenting the actions in the first user interface associated with the first modality and the second instructions comprise a second domain-specific language for presenting the actions in the second user interface associated with the second modality.

6. A computer-implemented method comprising:
receiving a notification associated with a resource of a cloud computing environment;
accessing, from a storage device and based at least in part on the notification and resource types associates with the resource, template data indicating a) actions for responding to the notification, b) one or more first instructions for presenting one or more actions in a first interface associated with a first modality, and c) and one or more second instructions for presenting the one or more actions in a second interface associated with a second modality different from the first modality;
determining, by a model and based at least in part on the template data, second data comprising a subset of the actions, the one or more first instructions, and the one or more second instructions; and
transmitting, over a network associated with the cloud computing environment, the second data to a computing device to cause the computing device to present the subset of the actions in the first interface associated with the first modality or the second interface associated with the second modality.

7. The computer-implemented method of claim 6, wherein the one or more first instructions or the one or more second instructions comprise respective data formatting information for presenting the subset of the actions.

8. The computer-implemented method of claim 6, wherein the model is a graph model that is configured to output a graph representation between the actions, and further comprising:
receiving, from the graph model, output data representing a first context between a first action and a second action of the actions; and
determining the second data based at least in part on the output data, the second data representing one or more recommendations for responding to the notification.

9. The computer-implemented method of claim 8, wherein:
the graph model generates a knowledge graph representing a second context between one or more of the actions and a third action,
the third action is absent from the actions associated with the template data, and
the second data includes the third action.

10. The computer-implemented method of claim 6, wherein the second data represents recommendation data, and further comprising:
inputting user preference data indicating a preferred action to perform for the resource;
inputting action data indicating a previous action performed in response to another notification associated with the resource at a previous time; and
determining the recommendation data based at least in part on the user preference data and the action data.

11. The computer-implemented method of claim 6, wherein:
the first modality and the second modality utilize different communication channels for exchanging data associated with the notification, and
the one or more first instructions comprise a first domain-specific language for presenting the actions in the first interface associated with the first modality and the one or more second instructions comprise a second domain-specific language for presenting the actions in the second interface associated with the second modality.

12. The computer-implemented method of claim 6, wherein the actions include a first action and a second action, and further comprising:
determining, by the model, a first node to represent the first action and a second node to represent the second action;
determining, by the model, a third node to represent a third action;
applying an algorithm to the first node, the second node, and the third node to identify connections between the first action, the second action, and the third action; and
determining, based at least in part on the connections, to include to the third action as part of the second data.

13. The computer-implemented method of claim 6, wherein the first instructions are associated with a first Application Program Interface (API) and the second instructions are associated with a second API.

14. The computer-implemented method of claim 6, further comprising:
receiving data associated with the resource at a previous time;
determining a state of the resource, the state including one of: an open state, a closed state, an in-progress state, a pending state, a running state, or a stopped state; and
determining the second data based at least in part on the data and state.

15. The computer-implemented method of claim 6, wherein:
the first modality is associated with a mobile device and the second modality is associated with a device different from the mobile device.

16. One or more non-transitory computer-readable media storing instructions that, when executed, cause one or more processors to perform operations comprising:
receiving a notification associated with a resource of a cloud computing environment;
accessing, from a storage device and based at least in part on the notification and resource type associates with the resource, template data indicating a) actions for responding to the notification, b) one or more first instructions for presenting one or more actions in a first interface associated with a first modality, and c) and one or more second instructions for presenting the one or more actions in a second interface associated with a second modality different from the first modality;

determining, by a model and based at least in part on the template data, second data comprising a subset of the actions, the one or more first instructions, and the one or more second instructions; and transmitting, over a network associated with the cloud computing environment, the second data to a computing device to cause the computing device to present the subset of the actions in the first interface associated with the first modality or the second interface associated with the second modality.

17. The one or more non-transitory computer-readable media of claim 16, wherein the first instructions or the second instructions comprise respective data formatting information for presenting the subset of the actions.

18. The one or more non-transitory computer-readable media of claim 16, wherein the model is a graph model that is configured to output a graph representation between a first action and a second action of the actions, and the operations further comprising:

receiving, from the graph model, output data representing a context between a first action and a second action of the actions; and determining the second data based at least in part on the output data, the second data representing one or more recommendations for responding to the notification.

19. The one or more non-transitory computer-readable media of claim 16, wherein the second data represents recommendation data, and further comprising:

inputting user preference data indicating a preferred action to perform for the resource;

inputting action data indicating a previous action performed in response to another notification associated with the resource at a previous time; and determining the recommendation data based at least in part on the user preference data and the action data.

* * * * *